Dec. 1, 1942.     M. WAID     2,303,804
ANTISKID DEVICE
Filed March 19, 1941
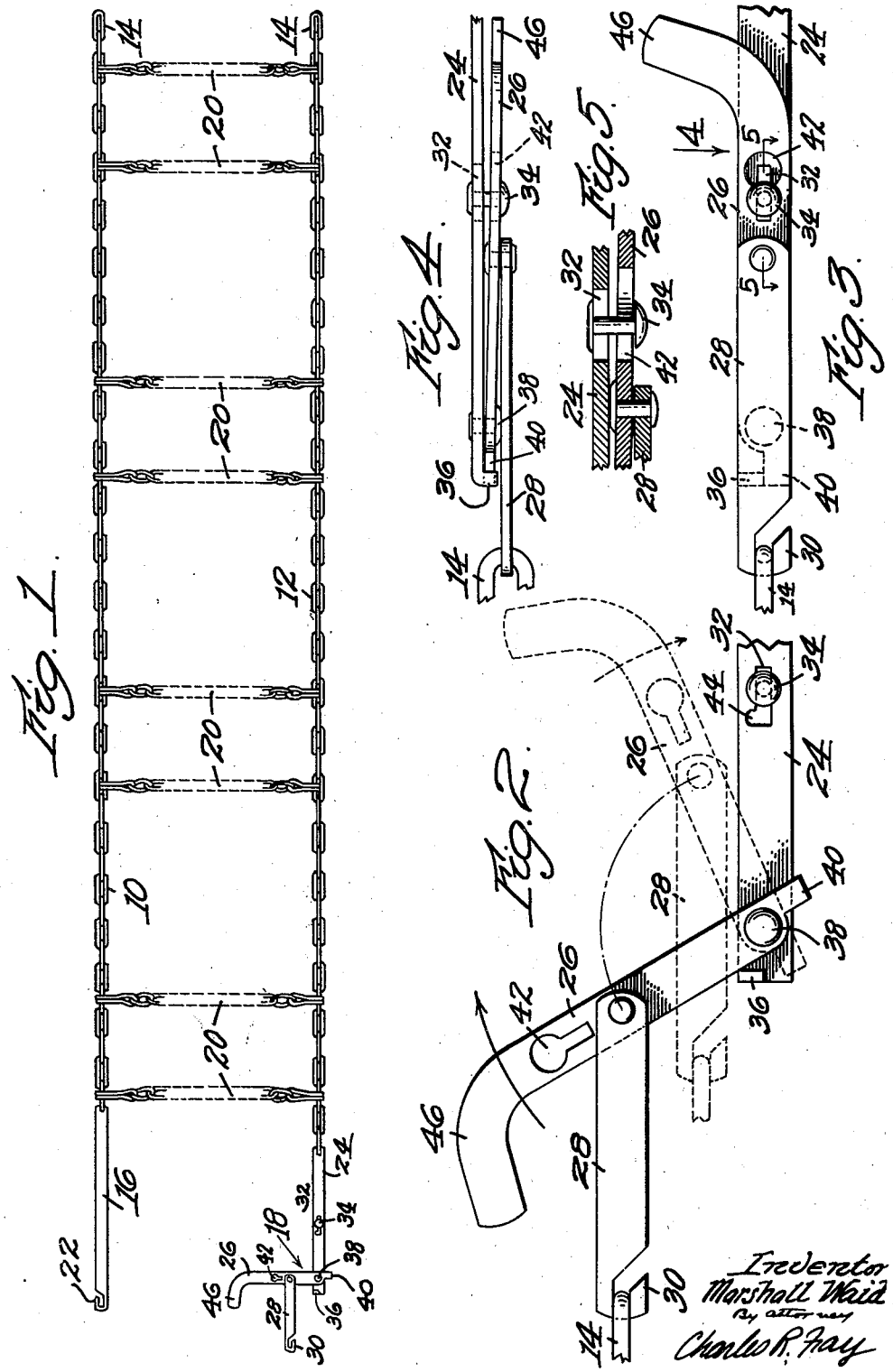
Inventor
Marshall Waid
By attorney
Charles R. Fray Patented Dec. 1, 1942

2,303,804

UNITED STATES PATENT OFFICE 2,303,804

ANTISKID DEVICE

Marshall Waid, Petersham, Mass.

Application March 19, 1941, Serial No. 384,150

3 Claims. (Cl. 24—68)

This invention relates to anti-skid devices for auto tires, and its principal object is to provide an extremely easily attached chain which will not become loose or fall off the tire under any conditions of use.

Another object is to provide a complete tire chain having four double cross links which can be secured to a tire in a shorter space of time than four ordinary emergency units.

Another object of the invention is to provide a complete tire chain having an elongated bar and simple hook for securing the inner circumferential chain and an easily manipulatable hitch or tightener of great leverage for securing and tightening the outer circumferential chain.

Other objects and advantages of the invention will appear hereinafter.

Reference is to be had to the accompanying drawing, in which

Fig. 1 is a plan view of a chain embodying the present invention as it appears when spread out;

Fig. 2 is an enlarged elevational view of the tightener as it appears when used to tighten the chain;

Fig. 3 is an elevational view of the tightener in closed condition;

Fig. 4 is a top plan view of the tightener looking in the direction of arrow 4 in Fig. 3; and Fig. 5 is an enlarged section on line 5—5 of Fig. 4.

Referring to Fig. 1, the numeral 10 indicates the inner circumferential chain and 12 the outer circumferential chain. End links 14 of both chains are ordinary links for attachment to the other ends of their respective chains, the inner chain 10 having a long narrow bar 16 attached thereto, and outer chain 12 having a tightener hitch 18.

Cross-chains 20 are arranged in spaced pairs as shown, and each pair will be located diametrically oppositely to the next alternate pair when arranged on a tire. This gives the effect of four double chain emergency units, as far as the driving and anti-skid effects are concerned, but the cross-chains are all connected to their circumferential chains as shown. The result of comparatively widely spacing the cross-chain pairs is to allow a greater tightening effect about the periphery of the tire, and this result contributes largely to the success of the present device as will appear hereinafter.

Bar 16 is of a length approximately equal to the space between each cross-chain pair, and has an end hook 22 for engaging end link 14 on the inner circumferential chain. Tightener 18 comprises a bar 24 slightly shorter than bar 16, a lever 26 pivoted adjacent the free end of bar 24, and a link 28 pivoted to the lever intermediate the latter's ends. Link 28 has an end hook 30 similar to hook 22.

Bar 24 is secured by any desired means to its circumferential chain, and is provided with a slot 32 for the sliding reception of a headed rivet 34. A stop 36 extends laterally from the bar 24 at its end remote from the chain 12 to one side of pivot 38 for lever 26. Lever 26 has an end abutment 40 for engagement with stop 36 when the tightener is closed, and, as seen in Fig. 2, one edge of lever 26 abuts stop 36 in the forwardmost position of the former.

Lever 26 is provided with a keyhole slot 42 for reception of the rivet 34 to lock the lever to bar 24 in closed position, Figs. 3 and 4. A head of the rivet slips thru the enlarged part of slot 42 and then the rivet may be slid into the narrow part of the slot to lock the parts. An angle 44 may be used if desired to further insure against the rivet sliding back. An angled handle 46 is provided on lever 26 for ease in manipulation thereof.

In the operation of the device, the chain unit is placed over the tire so that inner chain 10 hangs loosely, and bar 16 is used as a handle by which hook 22 is easily engaged with its corresponding end link 14. The outer chain 12 is then pulled into approximate position, so that hook 30 may be engaged with its end link 14, with the tightener extended as in Fig. 2. The circumferential chains are adapted to fit the tire so that in the position just described they will be fairly tight. As the handle 46 is actuated towards closed position of the tightener, the end link 14 will be seen to be moved a considerable distance to the right in Fig. 2, thus tensioning the outer chain, and thereby tending to pull the inner chain up over the tire tread into final desired position. This action is rendered easier by reason of the small number of cross-links and the fact they are arranged in diametrical pairs.

When lever 26 is closed, the rivet 34 is actuated to lock the parts, and thereafter the tendency of the chain is to pivot lever 26 toward open position. The relatively great movement of link 28 and its resultant impressment of tension on the chain 12 accomplishes this result, but as the lever bears on rivet 34, the parts will be seen to be very tightly frictionally locked, and the greater the tension, due for instance to high speeds, the tighter the rivet is clamped between the bar 24 and lever 26.

From the above, it will be seen that due to the construction and operation of the tightener, no chain fasteners are necessary, simple hooks, as shown, being sufficient to retain the chain on the tire.

Having thus described my invention and the advantages thereof, I do not wish to be limited to the details herein disclosed, otherwise than as set forth in the claims, but what I claim is:

1. A tire-chain tightener comprising an elongated element adapted to be secured to a chain-link at one end, a lever element pivoted to said first-named element adjacent but just short of the other end thereof, a rigid link pivoted intermediate the ends of the lever, said link being longer than the distance between its pivot to the lever and the end of the first-named element to which the lever is pivoted when the former and said lever are in parallel and side by side position, whereby the free end of the link extends beyond said first-named element, means forming a slot in said link in the extending portion thereof for the admission of a chain-link, and hand-manipulated cooperating means on said lever element and first-named element adapted to positively lock the same in said position against relative pivoting movement in either direction, said positive locking means comprising a key-hole slot in one element and an axially and laterally slidable rivet or the like in the other element.

2. A tire-chain tightener comprising a flat bar, a flat lever pivoted parallel thereto adjacent but short of one end thereof, a link pivoted intermediate the ends of the lever, the latter having an extension beyond its pivot connection to the bar, a lateral stop on said bar more adjacent the end of the latter than said pivot connection, said stop being effective to contact said lever in one direction of its pivotal action, and the extension in its other pivotal direction, whereby said lever is limited in its pivotal action in both directions, and separate means to lock said bar and lever together in the position of the lever wherein the extension engages said stop.

3. A tire-chain tightener as received in claim 2 wherein said stop is located to one side of said pivot connection.

MARSHALL WAID.